United States Patent [19]

Manservigi et al.

[11] Patent Number: 5,097,940
[45] Date of Patent: Mar. 24, 1992

[54] APPARATUS FOR THE TEMPORARY STORAGE OF PRODUCTS

[75] Inventors: Alberto Manservigi; Antonio Gamberini, both of Bologna, Italy

[73] Assignee: G.D. Società per Azioni, Bologna, Italy

[21] Appl. No.: 675,072

[22] Filed: Mar. 22, 1991

[30] Foreign Application Priority Data

Apr. 4, 1990 [IT]  Italy ................................. 3427 A/90

[51] Int. Cl.⁵ ............................................ B65G 47/69
[52] U.S. Cl. ..................................... 198/447; 198/450
[58] Field of Search ............... 198/347.1, 347.2, 347.3, 198/427, 447, 441, 450

[56] References Cited

U.S. PATENT DOCUMENTS

| | | | |
|---|---|---|---|
| 3,976,190 | 8/1976 | Schmermund | 198/347.3 |
| 4,230,216 | 10/1980 | Wiens | 198/347.3 |
| 4,560,057 | 12/1985 | Applegate et al. | 198/347.3 X |
| 4,989,718 | 2/1991 | Steeber | 198/347.3 |
| 4,993,534 | 2/1991 | Adams et al. | 198/347.3 |

FOREIGN PATENT DOCUMENTS

| | | | |
|---|---|---|---|
| 3238888 | 4/1984 | Fed. Rep. of Germany | 198/347.1 |
| 2097744 | 11/1982 | United Kingdom | 198/347.1 |
| 2195311 | 4/1988 | United Kingdom | 198/347.1 |

*Primary Examiner*—D. Glenn Dayoan
*Attorney, Agent, or Firm*—Ladas & Parry

[57] ABSTRACT

An apparatus (1) for temporarily storing products (2), including two mutually coaxial equal wheels (6, 16) rotatable intermittently with identical laws of motion and provided peripherally with respective pluralities of equidistant radial compartments (8, 17) for containing respective products (2), a feeder device for introducing the products (2) in succession into the compartments (8) of a first (6) of the two wheels, an extractor device (15) for removing the products (2) in succession from the compartments (17) of the second (16) of the two wheels, a drum (11) positioned between the two wheels (6, 16) and provided with a plurality of peripheral compartments (12) to each contain a plurality of products (2), the compartments (12) having their longitudinal ends facing respective compartments (8, 17) of the two wheels (6, 16), and a transfer device (21) for simultaneously extracting a plurality of products (2) from a like number of compartments (8) of the first wheel (6) and inserting them into corresponding compartments (12) of the drum (11); the entry of each product (2) through a longitudinal end of a compartment (12) of the drum (11) causing the exit of another product (2) from the other end of the same compartment (12) and the entry of this product (2) into a compartment (17) of the second wheel (16).

7 Claims, 1 Drawing Sheet

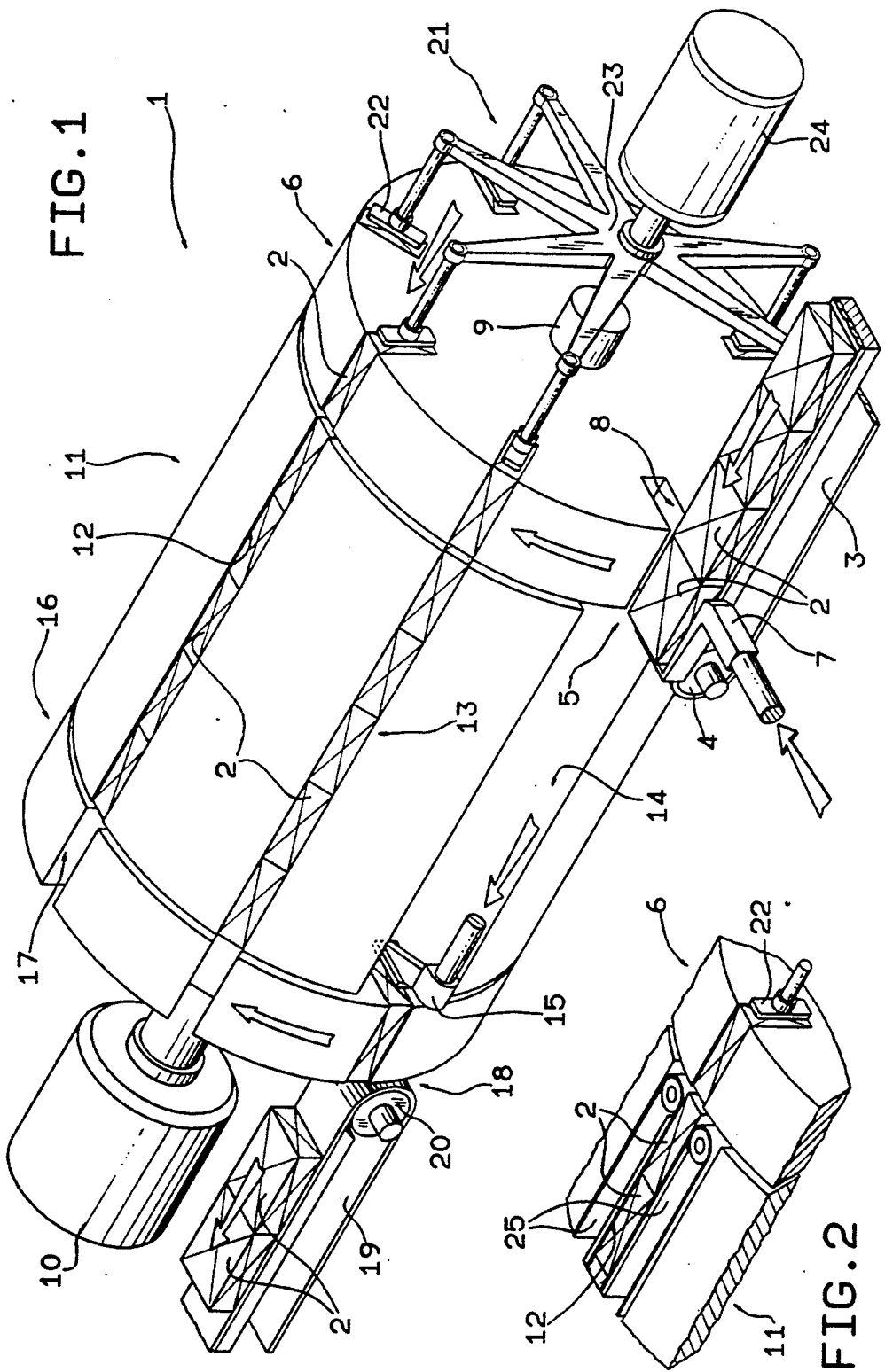

APPARATUS FOR THE TEMPORARY STORAGE OF PRODUCTS

BACKGROUND OF THE INVENTION

This invention relates to an apparatus for the temporary storage of products. In particular, the invention relates to an apparatus able to temporarily store packets of cigarettes as soon as they are formed, to enable the adhesive material with which the various portions of the packets have been joined together to dry. In the following description, reference will therefore be made to packets of cigarettes, but without the invention losing its general scope thereby. Apparatus for the temporary storage of packets are known for example from GB patent 2,189,429, comprising an intermittently rotating turret provided with equidistant peripheral compartments to each receive a row of packets which have just been formed. The packets are introduced in succession through one end of said compartments during halt periods of said turret, a dried packet then leaving through the other end of each compartment during every turret halt period. Apparatus of the described type have proved satisfactory from the operational viewpoint, but are very bulky because of the length of said compartments, which extend radially to the turret, and are very complicated as the said turret and all its accessory members have to be driven with intermittent rotary motion. A particular complication of the described apparatus is that in said turret the members which retain the packets in the compartments and the members which extract the packets from the compartments have to be externally driven for each individual compartment, the drive mechanisms used thus being extremely complicated as they have to transmit motion not to members occupying a fixed position, but instead to members which are themselves moving because of the rotary motion of the turret.

SUMMARY OF THE INVENTION

The object of the present invention is to provide an apparatus of the described type which is particularly simple and economical. The invention provides an apparatus for temporarily storing products, characterised by comprising two mutually coaxial equal wheels rotatable intermittently with identical laws of motion and provided peripherally with respective pluralities of equidistant radial compartments for containing respective products, feeder means for introducing said products in succession into the compartments of a first of said two wheels at an entry station, extractor means for removing said products in succession from the compartments of the second of said two wheels at an exit station, a fixed structure positioned between said two wheels and provided with a plurality of peripheral compartments to each contain a plurality of said products, said compartments extending longitudinally in a direction parallel to the axis of said wheels and having their longitudinal ends facing respective compartments of the two wheels when under halt conditions, and a transfer device for simultaneously extracting a plurality of said products from a like number of compartments of said first wheel and inserting them into corresponding compartments of said fixed structure; the entry of each said product through a longitudinal end of each compartment of said fixed structure being followed by the exit of another product from the other end of the same compartment and the entry of this product into a compartment of said second wheel.

BRIEF DESCRIPTION OF THE DRAWINGS

The present invention is described hereinafter with reference to the accompanying drawings, which show two non-limiting embodiments thereof and in which:

FIG. 1 is a schematic perspective view of a first embodiment of the apparatus according to the present invention; and FIG. 2 is a perspective view of a detail of a second embodiment of the apparatus according to the present invention. In FIG. 1 the reference numeral 1 indicates overall an apparatus for the temporary storage of products, which in the example considered are parallelepiped packets 2 of cigarettes.

DETAILED DESCRIPTION OF THE PREFERRED EMBODIMENTS

The apparatus 1 comprises a horizontal belt conveyor 3 passing endlessly about two end rollers (only one of which is shown), to convey packets 2 of cigarettes in succession towards an entry station 5, at which the transfer of the packets 2 to a wheel or cylindrical turret 6 takes place.

The packets 2 are removed in succession from the conveyor 3 by a feeder means consisting of a pusher element 7 driven with reciprocating motion in a direction parallel to the axes of the rollers 4 by actuator means, not shown, and are introduced into respective equidistant peripheral compartments 8 with which the turret 6 is provided. Said turret 6 has its axis horizontal and parallel to the direction in which the conveyor 3 extends, and is fixed onto a shaft 9 supported rotatably in a manner not shown, and connected to an actuator element 10 arranged to drive the shaft 9 with intermittent rotary motion in the form of advancement steps to move the compartments 8 in succession such that they halt at the station 5.

An end wall of the turret 6 (the left wall in FIG. 1) is faced by a fixed structure consisting of a substantially cylindrical drum 11 coaxial to the turret 6 and forming a store to receive a plurality of packets 2 from the turret 6.

The drum 11 is supported rigidly in a manner not shown by the base (not shown) of the apparatus 1, and is provided peripherally with a plurality of elongate compartments 12 parallel to its axis, these being seven in number in the example shown in FIG. 1, one of their ends facing respective compartments 8 of the turret 6 with the exception of that compartment 8 at the entry station 5, they being able to each contain a row of packets 2 which mutually abut at their smaller faces. More generally it can be said that the drum 11 is provided with a number of compartments 12 equal to the number of compartments 8 of the wheel 6 less one. A compartment 14 of larger transverse dimensions than the compartments 12 is provided in the periphery of the drum 11 in substantial alignment with the entry station 5, and houses, in a portion thereof close to that end of the drum 11 distant from said end adjacent to the turret 6, an extractor means consisting of a pusher element 15 able to move with reciprocating motion, under the action of actuator means, not shown, in a direction parallel to the axis of the drum 11.

Said shaft 9 axially traverses the entire drum 11, and fixed onto it in proximity to that end connected to the actuator element 10 there is a turret or wheel 16 equal to said turret 6 and arranged with one end adjacent to that end of the drum 11 distant from the end adjacent to the turret 6. The compartments 17 of the turret 16 are aligned with the respective compartments 8 of the turret 6 in directions parallel to the axis of the drum 11, said compartments 12 having their longitudinal ends facing respective compartments 8 and 17 of the wheels 6 and 16.

The pusher element 15 is able to extract respective packets 2 successively from the compartments 17 at an exit station 18 during the halt stages of the turret 16, and to push them onto a horizontal belt conveyor 19 extending endlessly about two end rollers 20 (only one of which is shown in FIG. 1), and extending in the same direction as said conveyor 3.

In front of that end of the turret 6 distant from the end adjacent to the drum 11 there operates a transfer device 21, also known hereinafter as a pusher device, comprising a plurality of pusher elements 22 supported by a common support 23 connected to an actuator element 24 arranged to drive the pusher device 21, in the manner described hereinafter, with reciprocating movements in a direction parallel to the axis of the drum 11. In the example illustrated in FIG. 1, the pusher elements 22 are seven in number and face those compartments 8 of the turret 6 which during the halt stages of the turret 6 do not coincide with said entry station 5.

The operation of the apparatus 1 will be described considering an initial situation in which the compartments 12 of the drum 11 are completely filled with packets 2 which mutually abut along their smaller faces, the compartments 8 of the wheel 6 are empty and the compartments 17 of the wheel 6 are empty with the exception of the compartment 17 at rest at the exit station 18. When in use, the packets 2 conveyed by the conveyor 3 are inserted in succession into the compartments 8 of the wheel 6 during the course of successive rotation steps of the wheel 6, until seven consecutive compartments 8 have been filled. The wheel 6 then undergoes a further rotation step to move the eighth compartment 8 into a position corresponding with the station 5. During the halt stage following this rotation step, the pusher element 7 inserts a packet 2 into the eighth compartment 8, the actuator element 24 produces a movement of the pusher device 21 towards the drum 11, and the pusher elements 22 simultaneously insert said seven packets 2 present in the compartments 8 into respective compartments 12 of the drum 11.

The entry of these seven packets 2 into the compartments 12 causes the exit of seven packets 2 from those ends of the compartments 12 distant from those facing the wheel 6, said packets 2 simultaneously entering seven compartments 17 of the wheel 16. With the wheel 16 still under halt conditions the pusher element 15 extracts a packet 2 from the compartment 17 at rest at the station 18 and pushes it onto the conveyor 19, which conveys it to further handling stations, not shown.

During the subsequent rotation steps of the wheels 6 and 16, the pusher element 7 again fills the said seven compartments 8, while the pusher element 15 progressively expels the packets 2 from the compartments 17 as these reach the station 18, so that the packets 2 are transferred to the conveyor 19. The operation of the apparatus 1 then continues cyclically, with the described simultaneous extraction of seven packets 2 from the compartments 8 and the insertion of a like number of packets 2 into the compartments 17 of the wheel 16.

Within the principle of the invention, numerous modifications can be made to the described apparatus 1 without leaving the scope of the inventive idea.

For example, one or more faces against which the packets 2 bear within the compartments 12 could be defined by conveyor means, and in particular, as shown in FIG. 2, the substantially radial side walls of the compartments 12 of the drum 11 could be defined by respective belt conveyors 25 mobile stepwise under the action of motor means, not shown, in synchronism with the movements of the pusher device 21, so that the packets 2 contained in the compartments 12 advance within said compartments 12 without having to push each other, with the risk of deformation or damage by sliding against said side walls.

Such belt conveyors 25 could also be used (in a manner not shown) for the base surfaces of the compartments 12. In non-illustrated modifications of the described apparatus 1, the drum 11 could be replaced by any fixed structure of noncyclindrical shape, provided with a number of compartments even considerably less than the number of compartments 8 and 17 of the wheels 6 and 16. These compartments would have to be structurally equal to said compartments 12, with their longitudinal ends facing respective consecutive compartments 8 and 17 of the wheels 6 and 16. From the aforegoing it is apparent that the apparatus 1 is particularly simple, in accordance with the stated object, as the drum 11 is stationary and the members provided for moving the packets 2 along the apparatus 1 are few in number and uncomplicated.

In addition, in the case of the embodiment shown in FIG. 2, there is no particular problem in driving the belt conveyors 25, as the drum 11 is stationary.

Finally, the wheels 6 and 16 could be driven independently of each other provided their laws of motion are identical.

We claim:

1. An apparatus for temporarily storing products, characterised by comprising two mutually coaxial equal wheels (6, 16) rotatable intermittently with identical laws of motion and provided peripherally with respective pluralities of equidistant radial compartments (8, 17) for containing respective products (2), feeder means (7) for introducing said products (2) in succession into the compartments (8) of a first (6) of said two wheels at an entry station (5), extractor means (15) for removing said products (2) in succession from the compartments (17) of the second (16) of said two wheels at an exit station (18), a fixed structure (11) positioned between said two wheels (6, 16) and provided with a plurality of peripheral compartments (12) to each contain a plurality of said products (2), said compartments (12) extending longitudinally in a direction parallel to the axis of said wheels (6, 16) and having their longitudinal ends facing respective compartments (8, 17) of the two wheels (6, 16) when under halt conditions, and a transfer device (21) for simultaneously extracting a plurality of said products (2) from a like number of compartments (8) of said first wheel (6) and inserting them into corresponding compartments (12) of said fixed structure (11); the entry of each said product (2) through a longitudinal end of each compartment (12) of said fixed structure (11) being followed by the exit of another product (2) from the other end of the same compartment (12) and the entry of this product (2) into a compartment (17) of said second wheel (16).

2. An apparatus as claimed in claim 1, characterised in that said fixed structure comprises a substantially cylindrical drum (11) provided with a number of said compartments (12) equal to the number of compartments (8, 17) of each said wheel (6, 16) less one, the compartments (12) of said drum (11) facing those respective compartments (8, 17) of said two wheels (6, 16) which during the halt stages of the wheels (6, 16) do not coincide with said entry and exit stations (5, 18).

3. An apparatus as claimed in claim 1, characterised in that said compartments (12) of said fixed structure (11) are bounded, along at least one of their faces against which said products (2) bear, by a belt conveyor (25) mobile stepwise in synchronism with the movements of said pusher device (21).

4. An apparatus as claimed in claim 1 characterised in that said two wheels (6, 16) are fixed onto the same shaft (9), which longitudinally traverses said fixed structure (11).

5. An apparatus as claimed in claim 2, characterised in that said compartments (12) of said fixed structure (11) are bounded, along at least one of their faces against which said products (2) bear, by a belt conveyor (25) mobile stepwise in synchronism with the movements of said pusher device (21).

6. An apparatus as claimed in claim 2, characterised in that said two wheels (6, 16) are fixed onto the same shaft (9), which longitudinally traverses said fixed structure (11).

7. An apparatus as claimed in claim 3, characterised in that said two wheels (6, 16) are fixed onto the same shaft (9), which longitudinally traverses said fixed structure.

* * * * *